United States Patent
Schüldt et al.

(10) Patent No.: US 11,778,106 B2
(45) Date of Patent: Oct. 3, 2023

(54) DETECTING AND FLAGGING ACOUSTIC PROBLEMS IN VIDEO CONFERENCING

(71) Applicant: Google LLC, Mountain View, CA (US)

(72) Inventors: Christian Schüldt, Stockholm (SE); Magnus Berggren, Stockholm (SE); John Fredric Lindstrom, Stockholm (SE)

(73) Assignee: Google LLC, Mountain View, CA (US)

( * ) Notice: Subject to any disclaimer, the term of this patent is extended or adjusted under 35 U.S.C. 154(b) by 199 days.

(21) Appl. No.: 17/328,978

(22) Filed: May 24, 2021

(65) Prior Publication Data

US 2021/0281686 A1    Sep. 9, 2021

Related U.S. Application Data

(63) Continuation of application No. 16/694,898, filed on Nov. 25, 2019, now Pat. No. 11,019,219.

(51) Int. Cl.
*H04N 7/15* (2006.01)
*H04M 9/08* (2006.01)
*H04M 3/56* (2006.01)

(52) U.S. Cl.
CPC .......... *H04M 9/085* (2013.01); *H04M 3/567* (2013.01); *H04M 3/568* (2013.01); *H04N 7/15* (2013.01)

(58) Field of Classification Search
CPC ........ G01S 3/802; G01S 3/8083; G06F 3/165; G10L 21/0208; G10L 25/60; G10L 25/78; G10L 21/0272; H04L 1/20; H04L 12/1827; H04L 43/06; H04L 43/0817; H04L 51/04; H04L 65/1083; H04M 3/2236; H04M 3/565; H04M 3/567; H04M 3/568;

(Continued)

(56) References Cited

U.S. PATENT DOCUMENTS 5,778,082 A * 7/1998 Chu .................. H04S 1/007
                                                      348/E7.083
6,124,882 A    9/2000 Voois et al.
(Continued)

FOREIGN PATENT DOCUMENTS

EP         3270377         1/2018

OTHER PUBLICATIONS

PCT Notification of Transmittal Of The International Search Report And The Written Opinion Of The International Searching Authority for PCT Application No. PCT/US2020/053654, dated Jan. 14, 2021, 25 pages.

*Primary Examiner* — Gerald Gauthier
(74) *Attorney, Agent, or Firm* — Lowenstein Sandler LLP (57) ABSTRACT

A method for detecting and flagging problems in videoconferencing is provided. The method includes measuring, by a processing device of a user videoconferencing device, a first set of acoustic data associated with a conference room during a video conference attended by a plurality of users. The first set of acoustic data indicates one or more acoustic parameters, including the reverberation time, the signal-to-noise ratio, or the absolute noise level of the conference room. The method further includes comparing the one or more first acoustic parameters to one or more thresholds during the video conference. Moreover, the method includes providing at least one of the first acoustic parameters or a result of the comparison to the at least one user during the video conference.

20 Claims, 6 Drawing Sheets

(58) Field of Classification Search
CPC ...... H04M 9/085; H04M 9/082; H04N 7/142; H04N 7/147; H04N 7/148; H04N 7/15; H04N 7/152; H04N 21/422; H04N 21/478; H04N 23/61; H04N 5/06; H04N 7/141; H04N 21/42203; H04N 21/4788; H04N 23/611; H04R 3/005; H04S 1/007; A61B 5/1112; G06Q 10/06; G06Q 10/1093
See application file for complete search history.

(56) References Cited

U.S. PATENT DOCUMENTS

| | | | |
|---|---|---|---|
| 6,185,152 B1* | 2/2001 | Shen | G01S 3/802 348/E7.079 |
| 7,822,065 B2 | 10/2010 | Lu | |
| 8,150,052 B2* | 4/2012 | Gygax | H04M 9/082 348/14.08 |
| 8,441,516 B2* | 5/2013 | Satyanarayanan | H04L 43/06 348/14.09 |
| 8,654,955 B1* | 2/2014 | Lambert | H04M 9/082 379/205.01 |
| 8,743,198 B2* | 6/2014 | Padmanabh | H04N 7/15 348/169 |
| 8,995,635 B1* | 3/2015 | Satyanarayanan | H04M 3/565 379/202.01 |
| 9,179,100 B2* | 11/2015 | Guo | H04N 7/152 |
| 9,256,457 B1 | 2/2016 | Leske et al. | |
| 9,274,606 B2* | 3/2016 | Yee | H04N 21/4788 |
| 9,497,412 B1* | 11/2016 | Rosenberg | H04L 1/20 |
| 9,560,319 B1* | 1/2017 | Pan | H04N 7/152 |
| 9,843,455 B2* | 12/2017 | Bathurst | H04L 12/1827 |
| 10,079,941 B2* | 9/2018 | Dickins | G10L 21/0272 |
| 10,134,414 B1* | 11/2018 | Feng | G01S 3/8083 |
| 10,382,722 B1* | 8/2019 | Peters | H04N 7/152 |
| 10,757,366 B1* | 8/2020 | Kwatra | H04N 7/147 |
| 10,819,857 B1* | 10/2020 | Chu | G10L 21/0208 |
| 11,019,219 B1* | 5/2021 | Schüldt | H04M 9/085 |
| 2002/0067835 A1 | 6/2002 | Vatter | |
| 2004/0032487 A1* | 2/2004 | Chu | H04N 7/142 348/14.09 |
| 2004/0032796 A1* | 2/2004 | Chu | H04R 3/005 348/E7.079 |
| 2007/0071206 A1 | 3/2007 | Gainsboro et al. | |
| 2007/0263085 A1* | 11/2007 | Marton | H04N 7/147 348/E7.083 |
| 2011/0063405 A1* | 3/2011 | Yam | H04N 7/147 348/14.08 |
| 2011/0211037 A1* | 9/2011 | Gygax | H04N 21/42203 348/E7.083 |
| 2011/0279638 A1* | 11/2011 | Periyannan | H04N 7/141 348/14.09 |
| 2012/0120085 A1* | 5/2012 | Kanalakis, Jr. | H04N 21/4788 345/589 |
| 2012/0127259 A1* | 5/2012 | Mackie | H04N 7/142 348/E7.083 |
| 2012/0142324 A1 | 6/2012 | Kim et al. | |
| 2012/0159347 A1* | 6/2012 | Fish | H04L 51/04 715/751 |
| 2012/0169831 A1* | 7/2012 | Nietfeld | H04N 7/148 348/E7.083 |
| 2012/0320143 A1* | 12/2012 | Chu | H04N 7/15 348/E7.083 |
| 2013/0083944 A1 | 4/2013 | Kvist et al. | |
| 2013/0106976 A1* | 5/2013 | Chu | H04N 7/148 348/E7.083 |
| 2013/0127979 A1* | 5/2013 | Koh | H04M 3/567 348/E7.083 |
| 2014/0247319 A1* | 9/2014 | Anderson | H04L 12/1827 348/14.08 |
| 2015/0111552 A1* | 4/2015 | Kaye | G06Q 10/1093 455/552.1 |
| 2015/0179186 A1* | 6/2015 | Swierk | G10L 25/60 704/276 |
| 2015/0201278 A1 | 7/2015 | Bao et al. | |
| 2015/0244981 A1* | 8/2015 | Johnson | H04N 21/42203 348/14.07 |
| 2015/0350769 A1* | 12/2015 | Sun | H04N 23/61 348/14.08 |
| 2016/0205351 A1* | 7/2016 | Chan | H04N 7/152 348/14.09 |
| 2016/0267923 A1* | 9/2016 | Goto | H04M 3/568 |
| 2018/0005642 A1* | 1/2018 | Wang | G10L 21/0208 |
| 2018/0039951 A1 | 2/2018 | Wynn et al. | |
| 2018/0116599 A1* | 5/2018 | Bastide | A61B 5/1112 |
| 2018/0349857 A1* | 12/2018 | Dahir | G10L 25/78 |
| 2018/0358034 A1* | 12/2018 | Chakra | G10L 25/78 |
| 2019/0116338 A1* | 4/2019 | Ma | H04N 7/15 |
| 2019/0141292 A1 | 5/2019 | Thakkar et al. | |
| 2019/0236554 A1* | 8/2019 | Hill | G06Q 10/06 |
| 2019/0268569 A1* | 8/2019 | Takita | G06F 3/165 |
| 2019/0392854 A1* | 12/2019 | Wurmfeld | H04M 3/2236 |
| 2020/0344278 A1* | 10/2020 | Mackell | H04L 65/1083 |
| 2021/0176428 A1* | 6/2021 | Peters | H04N 7/152 |
| 2021/0281686 A1* | 9/2021 | Schüldt | H04M 3/567 |

* cited by examiner

DETECTING AND FLAGGING ACOUSTIC PROBLEMS IN VIDEO CONFERENCING

RELATED APPLICATION

This application is a continuation of U.S. patent application Ser. No. 16/694,898, filed Nov. 25, 2019, entitled "DETECTING AND FLAGGING ACOUSTIC PROBLEMS IN VIDEO CONFERENCING," which is hereby incorporated by reference in its entirety.

TECHNICAL FIELD

Aspects and implementations of the present disclosure relate to the field of videoconferencing, and more particularly to detecting and flagging acoustic problems in a videoconference.

BACKGROUND

Videoconferencing provides multiple participants at different locations the ability to communicate with each other. Videoconferencing devices, which may include one or more microphones and/or cameras, are often installed in conference rooms. A videoconferencing device may capture and transmit audio and video content to the other conference participants over a network.

SUMMARY

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular embodiments of the disclosure or any scope of the claims. Its sole purpose is to present some concepts of the disclosure in a simplified form as a prelude to the more detailed description that is presented later.

In some implementations, a system and method are disclosed for detecting and flagging acoustic problems in video conferencing. A videoconferencing device may measure a first set of acoustic data in a conference room during a video conference attended by one or more users. The acoustic data may indicate acoustic parameters of the conference room, including the reverberation time, the signal-to-noise ratio, or the absolute noise level. The videoconferencing device may then determine whether any of the acoustic parameters suggest that feedback is to be provided to one or more users. The feedback may include an action that, when performed by one of the users, may improve the acoustic parameters of the video conference room. Upon determining that feedback is to be provided, the videoconferencing device may provide the feedback to the one or more users. The videoconferencing device may then measure a second set of acoustic data and compare it to the first set of acoustic data. If the second set of acoustic data indicates an improvement compared to the first set, the videoconferencing device may notify the users that the acoustic parameters have been improved.

In another implementation, a server may receive sets of acoustic data from a videoconferencing device during a video conference attended by one or more users. For each set of acoustic data, the server may determine whether any of the acoustic parameters satisfies a corresponding threshold condition. Upon determining that at least one of the acoustic parameters satisfies a threshold condition, the server may send an instruction to the videoconferencing device to provide feedback to the user(s) to perform an action that may improve the acoustic parameters of the room.

The subject matter, summarized above and described below in more detail, enables increased sound quality in videoconference meetings. The videoconference device and/or the server it is communicatively coupled to may analyze data received over time. Based on the collected data, the technology described herein may provide the user(s) and/or administrator with recommendations on how to improve the installation of the videoconferencing equipment in the room. The technology described herein may further notify users of possible improvements that can be made while the videoconferencing device is being used. Thus, higher audio quality and proper functionality of the videoconference device is enabled.

The subject matter described herein is not limited to the above exemplary listed advantages. Further advantages are achievable and recognizable in view of the disclosure of the present application.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

These drawings may be better understood when observed in connection with the following detailed description.

DETAILED DESCRIPTION

Modern video conferencing systems may monitor the audio signal quality based on the performance of the audio conferencing equipment. The video conferencing system may determine that a conference room's equipment is malfunctioning, and alert a user or administrator of the malfunction. However, audio signal quality in video conferencing is not simply limited by the performance of the audio conferencing equipment. The acoustics of the room and physical set-up of the equipment, such as where the microphones are located with respect to the conference participants, is also important. Monitoring a video conferencing system without taking into account the acoustic properties of the room wastes computing resources because it overlooks a potentially major contributing factor affecting video conferencing equipment, namely the aspects affecting the acoustics of the room in which the equipment is located.

Aspects and implementations of the present disclosure address the above and other deficiencies or problems by providing technology for detecting and flagging the acoustic properties in videoconferencing. A videoconferencing device, used by videoconference meeting attendees, is capable of measuring the acoustic data of the room. The videoconferencing device may use one or more microphones in the video conference room to detect sound in the room. The videoconferencing device may then perform calculations on the sound detected in the room in order to determine a variety of acoustic parameters, such as reverberation time, signal to ambient background noise ratio, and absolute noise level.

One example of acoustic parameters calculated by the videoconferencing device is reverberation time, which is the amount of time it takes for sound to fade away in an enclosed area once the source of the sound has stopped generating the sound. Reflective surfaces in a room, such as whiteboards, glass doors or walls, and the conference table itself, may affect how sound travels around a room. If the reverberation is too long, the room may sound like it has an echo, which may impact the clarity of speech. If the reverberation time is too short, the room may sound acoustically dead. The size and shape of the room, as well as the number of people in the room, may also affect its reverberation time. The reverberation time may be improved by modifying physical attributes of the room, for example by covering reflective surfaces with sound absorbing material.

Another acoustic parameter the videoconferencing device may calculate is the signal to ambient background noise ratio, or simply the signal-to-noise ratio. This ratio compares the level of a desired signal to the level of background noise, and is often expressed in decibels. A ratio higher than one-to-one, or greater than zero decibels, indicates more signal than noise. Background noise may be caused by the building's heating or air conditioning system, elevators, projectors, vibrations, rustling of papers, airplanes, adjacent noisy spaces, etc. The signal-to-noise ratio may give an indication of how far away the microphones are from the user(s), and may be improved by moving the microphones closer to the user(s). The signal-to-noise ratio may also be improved by reducing the background noise.

Another acoustic parameter measured by the videoconferencing device may be the absolute noise level of the room. This parameter is simple yet important, as it may indicate a change in the room over time. An absolute noise level that is much different than the average absolute noise level for a room may indicate problem with the conference room, or with the videoconferencing equipment itself. Moreover, an absolutely noise level that is too high may indicate that there are too many people in the room, or that the room may benefit from sound proofing.

In one implementation, once the videoconferencing device has calculated any of these or other acoustic parameters, it may log the parameters in a data store. The videoconferencing device may then determine whether any of the acoustic parameters is irregular by comparing them to a threshold associated with each parameter. If any of the acoustic parameters is outside of its threshold, the videoconferencing device may provide feedback to at least one of the videoconference attendees, suggesting an action to be performed to improve the acoustic parameter. In another implementation, if any of the acoustic parameters is outside of its threshold, the videoconferencing device may additionally or alternatively provide feedback to an administrator, such as a fleet manager or conference room maintenance staff, suggesting one or more actions to be performed to improve the acoustic parameters.

In another implementation, the videoconferencing device may periodically transmit the acoustic parameters to a server. The server may then store the acoustic parameters, and compare them to thresholds associated with each parameter. Upon determining that any of the acoustic parameters is outside of its threshold, the server may send an instruction to the videoconferencing device, instructing it to notify the videoconference attendees. The notification may include one or more actions that, when performed by the users or attendees, may improve the acoustic parameters. In another embodiment, upon determining that any of the acoustic parameters if outside of its threshold, the server may send an instruction to the videoconferencing device, instructing it to notify an administrator (such as a fleet manager or conference room maintenance staff), in addition to or alternatively to the videoconference attendees. For example, the server may provide one or more notifications to an administrator based on determining (during one or more conferences) that one or more acoustic parameters are outside of its respective thresholds. The notification(s) to the administrator may be provided during the conference(s) or at another time (e.g., at completion of the conferences or a scheduled time of day). In any event, a notification may include one or more actions that, when performed by the administrator, may improve the acoustic parameters.

The videoconferencing device may then measure a second set of acoustic parameters (e.g., after the notification has been provided to one or more attendees). In one implementation, the videoconferencing device may compare the second set to the first set of acoustic parameters in order to determine whether the acoustic parameters have improved. The device may further or alternatively compare the second set of acoustic parameters to their respective thresholds. If the second set of parameters indicates an improvement and/or the second set of parameters is within the threshold values, the videoconferencing device may notify the users that their actions have improved the acoustic parameters of the videoconferencing room. In another implementation, the videoconferencing device may transmit the second set of acoustic parameters the server. The server may then compare the second set of acoustic parameters to the first set of acoustic parameters and/or to the threshold values, in order to determine whether the acoustic parameters in the videoconferencing room have improved. If they have improved, the server may send an instruction to the videoconferencing device, instructing the videoconferencing device to notify the users that the acoustic parameters have improved.

In another implementation, the server may analyze the parameters and provide an administrator with the aggregated data in the form of a dashboard, for example. The dashboard may give an overview of the videoconference rooms in the administrator's purview. The dashboard may include a list of conference rooms that have been flagged for having acoustic parameters outside of a given threshold.

Some technical advantages of implementations of the present disclosure include enhancing video conference monitoring during video conference meetings, as well as between video conference meetings. The data collected and analyzed may improve the video conferencing equipment as it is being used, and hence may reduce inefficient and wasteful consumption of video conferencing resources. Furthermore, the data collected may be provided to a system administrator who may then improve the video conferencing system between uses. This may reduce wasting videoconferencing resources spent on meetings with undesirable acoustics.

Various aspects of the above referenced methods and systems are described in detail herein below by way of examples, rather than by way of limitation.

Figure 1:
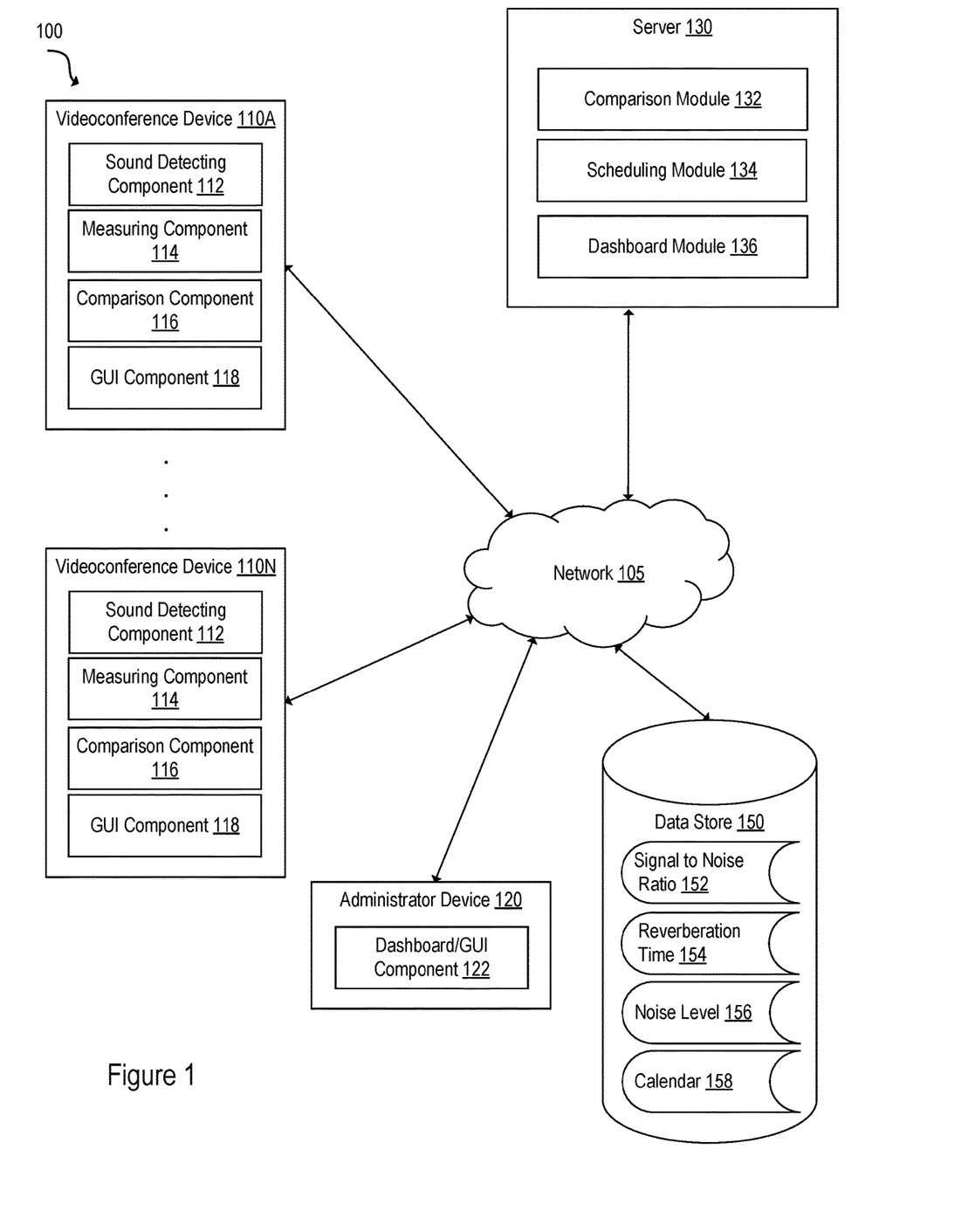
FIG. 1 illustrates an example system architecture for detecting and flagging acoustic problems in video conferencing, in accordance with an implementation of the disclosure.

FIG. 1 illustrates an example system architecture 100 for detecting and flagging acoustic problems in video conferencing, in accordance with an implementation of the disclosure.

The system architecture 100 may include a server 130 that may be connected to videoconference devices 110A-110N, an administrator device 120, and a data store 150 via a network 105. The network 105 may be a public network (e.g., the Internet), a private network (e.g., a local area network (LAN) or wide area network (WAN)), or a combination thereof. The network 105 may include a wireless infrastructure, which may be provided by one or more wireless communications systems, such as a wireless fidelity (WiFi) hotspot connected with the network 105 and/or a wireless carrier system that can be implemented using various data processing equipment, communication towers, etc. Additionally or alternatively, the network 105 can include a wired infrastructure (e.g., Ethernet).

The videoconference devices 110A-110N may include a video camera or webcam to provide video input; two or more microphones; a computer screen, monitor, TV or projector to broadcast video output; speakers or headphones for audio output; and a computing device to compress analog audio and video data into digital packets on the distributing end, and decompress data at the endpoint. These features may all be included within the videoconference device 110A-110N. Additionally or alternatively, these features may be separate and communicatively coupled to the videoconference devices 110A-110N.

The videoconference devices 110A-110N may include a sound detecting component 112, a measuring component 114, a comparison component 116, and a graphical user interface (GUI) component 118. The sound detecting component 112 may detect sound and store acoustic parameters derived from the sound originating in the videoconference room in which the device is located. The sound detecting component 112 may use a microphone to detect a sound signal generated from a source in the conference room in which the videoconference device is located. The sound detecting component 112 may use a microphone to measure the background noise level in the conference room.

The sound detecting component 112 may detect sound and store acoustic parameters derived from the sound periodically throughout the day, and/or may detect and store sounds periodically during video conference meetings occurring in the conference room in which the device is located. The sound detecting component 112 may be able to differentiate between background noise and the desired signal in a video conferencing room.

The measuring component 114 may measure and calculate the acoustic parameters based on the sound detected from the sound detecting component 112. The measuring component 114 may calculate the signal-to-noise ratio by comparing the sound signal generated from a source in the conference room to the background noise level of the conference room. The measuring component 114 may calculate the reverberation time by estimating (e.g., based on historical data for similar conference rooms) the amount of time it takes for the sound signal to fade after the signal source has stopped emitting sound. The measuring component 114 may measure the absolute noise level of the conference room based on the combined signal and background noise levels. In some implementations, the measuring component 114 may then store the calculated acoustic parameters in the data store 150. Alternatively, the measuring component 114 may send the calculated acoustic parameters to the server 130, which then stores them in the data store 150.

In some implementations, the comparison component 116 of videoconference device 110A-110N may compare the acoustic parameters (signal-to-noise ratio, reverberation time, and absolute noise level) to a threshold associated with each parameter. For example, a commonly used threshold for reverberation time is the amount of time it takes for the sound pressure level to decrease by 60 decibels after the source of the sound has stopped generating the sound. If it takes less than 0.3 seconds for the sound level to decrease by 60 decibels, the room may be considered acoustically "dead." If it takes more than 2 seconds for the sound level to decrease by 60 decibels, the room may be considered echoic. Too much reverberation time may negatively affect the intelligibility of speech, making it difficult for the other videoconference attendees to hear or understand the speaker. The size and shape of the room, as well as the items or number of participants in the room, may affect the reverberation time.

As another example, the higher the signal-to-noise ratio, the better the acoustics in a room. The absolute minimum acceptable signal-to-noise ratio may be 20 decibels; that is, the desired signal (for example, detected from the speaking voice of a video conference participant) is 20 decibels higher than the background noise of the room (for example, the sound from the building's mechanical systems (e.g. elevators), the sound of running the projector or lights in the conference room, the sound from the outside (e.g. traffic or airplane sounds), and/or sound from adjacent noisy rooms). A signal-to-noise ratio of 25-40 decibels may be considered good, while a signal-to-noise ratio of above 40 decibels may be considered excellent.

As yet another example, the absolute noise level in a room may be stored and used to determine whether the room conditions have changed over time. That is, the comparison component 116 may store a baseline absolute noise level for each conference room, and may determine when each conference room's noise level is out of the ordinary. For example, the comparison component 116 may be able to determine when a conference room is unusually loud, based on historical values of absolute noise level detected in that conference room. In another embodiment, the absolute noise level may be compared to a standard acceptable noise level threshold value in order to determine whether a conference room has acceptable acoustic properties.

In some other implementations, part or all of the above functionality of the comparison component 116 is performed by comparison module 132 of server 130 based on data provided by the videoconference devices 110.

The GUI component 118 of videoconference devices 110A-110N may be used to notify the users of the videoconference device, during the video conference, that one or more of the acoustic parameters in the room is abnormal. The GUI component 118 may receive information from the comparison component 116 or the comparison module 132 that one or more of the acoustic parameters is not within its associated parameter. The GUI component 118 may then notify the user(s) that one or more of the acoustic parameters is irregular, by displaying a visual notification on the GUI, causing the videoconference device to emit a sound notification, or by causing a light to flash on the videoconference device, for example. The GUI component 118 may then provide the user(s), during the video conference, with a suggested action that can improve the acoustic parameters of the room. This may include, for example, suggestions to alter a behavior causing excess background noise, move a microphone to be closer to a user to improve the signal-to-noise ratio, or cover reflective surfaces in the room to reduce reverberation time. In some implementations, data store 150 includes rules that define suggested actions to be taken. The rules can be in the form of entries that each indicate a range of one or more acoustic parameters and a predetermined action to be taken. Based on the current set of acoustic parameters, a corresponding action from the data store 150 may be selected by the comparison component 116 or the comparison module 132 and suggested to the user(s) via the GUI. Alternatively, a trained machine learning model may be applied to the current set of acoustic parameters to predict an action that should improve these parameters. The machine learning model may be trained based on training data that includes training inputs (e.g., historical acoustic parameters, size and other relevant properties of respective conference rooms and a number of users in the room) and target outputs (e.g., previously taken actions that addressed acoustic problems in the respective conference rooms). The machine learning model may be trained by the server 130 or a separate system and may be hosted by the server 130 or each videoconference device 110A-110N.

For example, a videoconference device 110A-110N user may be eating a snack or lunch right next to one of the microphones. The snack packaging or the sound of cutlery against the plate may be creating excess background noise, and hence may affect the signal-to-noise ratio, making it difficult for videoconference users to hear the speaker. The comparison component 116 or the comparison module 132 may be able to identify the source of the excess noise based on the information provided to the measuring component 114 from the sound detecting component 112. For example, the comparison component 116 or the comparison module 132 may identify which microphone is picking up the excess noise. The comparison component 116 or the comparison module 132 may instruct the GUI component 118 to notify the videoconference device 110A-110N users of the poor acoustic parameter (in the eating example above, the affected acoustic parameter may be the signal-to-noise ratio, as the excess noise caused by the eating participant may be drowning out the speaker). The GUI component 118 may then instruct the users to move the microphone that is picking up the excess background noise, or perhaps to turn off or mute that microphone, for example.

The system architecture 100 may also include a data store 150, which may be separate from the server 130 and communicatively coupled to the server 130, or which may be part of the server 130. In some implementations, the data store 150 may be included as part of the videoconference devices 110A-110N. The data store 150 may store the measured and calculated acoustic parameters associated with each videoconference device, including signal-to-noise ratio 152, reverberation time 154, and absolute noise level 156. The data store 150 may also store calendar data 158, which may include a list of meetings scheduled in the conference rooms in which the videoconference devices 110A-110N are located. In addition, the data store 150 may store various thresholds for respective acoustic parameters.

The server 130 may represent one or more physical machines (e.g., server machines, desktop computers, etc.) that include one or more processing devices communicatively coupled to memory devices and input/output devices.

The server 130 may host a comparison module 132, a scheduling module 134, and a dashboard module 136.

The comparison module 132, scheduling module 134, and dashboard module 136 may be implemented as computer instructions that are executable by one or more processing devices on the server 130. In alternative implementations, the comparison module 132, the scheduling module 134, and/or the dashboard module 136 may be installed on the videoconference devices 110A-110N (e.g., as standalone applications). In yet alternative implementations, applications on the videoconference devices 110A-110N may interact with the comparison module 132, the scheduling module 134, and/or the dashboard module 136, and may perform some of the functionality of the comparison module 132, the scheduling module 134, and/or the dashboard module 136.

In one implementation, the comparison module 132 may receive acoustic parameters from a videoconference device 110A-110N. The comparison module 132 may store the acoustic parameters in data store 150. In one implementation, the comparison module 132 may compare each acoustic parameter to its associated threshold, as described above. If any of the acoustic parameters is outside its associated threshold, the server 130 may notify the videoconference device 110A-110N from which it received the abnormal parameter. For each set of acoustic parameters the server 130 receives, the comparison module 132 may store the parameters and compare the parameters to their thresholds.

The comparison module 132 may also compare a second set of acoustic parameters to the first set of acoustic parameters previously received from a videoconference device 110A-110N in order to determine whether the acoustic parameters have been improved. The comparison module 132 may also compare the second set of acoustic parameters to their respective thresholds. The comparison module 132 may then notify the videoconference device 110A-110N of whether the acoustic parameters have been improved. The comparison module 132 may also use the above results indicating whether the acoustic parameters have been improved to modify the rules that define suggested actions to be taken to achieve the improvement or to cause the machine learning model predicting the suggested actions to be re-trained.

The dashboard module 136 may notify an administrator of the acoustic parameters of the conference rooms. The dashboard module 136 may gather data stored in data store 150, and provide the acoustic parameters for the videoconference devices 110A-110N to the administrator. The dashboard may include historical data for each conference room in which videoconference devices 110A-110N are located, as well as the real-time acoustic parameters from the videoconference devices 110A-110N. The dashboard module 136 may flag certain conference rooms as problematic based on the rooms' acoustic parameters. For example, if a conference room has an unusually high absolute noise level, the dashboard module 136 may flag that room as problematic. The dashboard module 136 may notify the administrator of current and/or ongoing acoustic problems with a conference room.

The scheduling module 134 may identify alternative available conference rooms if a conference room is exhibiting poor acoustic parameters. The scheduling module 134 may access the calendar data 158 in data store 150, and for each calendar entry scheduled in a room that has been flagged as problematic by the dashboard module 136, the scheduling module 134 may identify an alternative available conference room. The scheduling module 134 may take into consideration the size of the room reserved for a meeting and the number of attendees when making scheduling recommendations. For example, a large room with only a few attendees may affect the room's reverberation time, as there are fewer bodies to absorb sound, resulting in a higher reverberation time. As another example, an unnecessarily large or exceptionally small room for the number of attendees may affect the signal-to-noise ratio or absolute noise level in a room. The scheduling module 134 may suggest relocating the meeting to a smaller or larger room in order to enhance the acoustic properties of the meeting.

The scheduling module 134 may notify the attendees and/or the administrator of the suggested room change. In another implementation, the scheduling module 134, using calendar data 158, may automatically reschedule a meeting. For example, the scheduling module 134 may determine that one or more of the acoustic parameters is outside of its threshold value and that no meeting should occur in that conference room until the problem has been resolved. The scheduling module 134 may find another conference room more suitable for the meeting. The scheduling module 134 may then change the calendar entry to reflect the updated meeting location, and notify the users and/or the administrator of the location change. In some implementations, the rescheduling may occur during the video conference if poor acoustic parameters are detected when the video conference is actually taking place, and the scheduling module 134 may instruct the GUI component 118 to notify the participants of the video conference of the room change.

The system architecture 100 may also include an administrator device 120. The administrator device 120 may include a dashboard/GUI component 122. The dashboard/GUI component 122 may receive acoustic parameters from either the server 130 or one of the videoconference devices 110A-110N. The dashboard/GUI component 122 may present a summary of all the videoconference rooms in the administrator's purview. This summary may include the current acoustic parameters for each conference room, as well as historical data demonstrating how the acoustic parameters have changed over time. The administrator may also be presented with a list of flagged conference rooms, including suggestions of how to improve the acoustics in the problematic rooms. For example, for a conference room that consistently has a high reverberation time, the dashboard/GUI component 122 may include recommendations to install dampening materials in the room, such as curtains or carpets. As another example, for a room with a consistently low signal-to-noise ratio, the dashboard/GUI component 122 may include recommendations to inspect the microphone placements in the conference room to ensure that the microphones are picking up the intended audio signals. As another example, for a room with consistently high absolute noise levels, the dashboard/GUI component 122 may include a suggestion to the administrator to investigate the source of the noise.

Figure 2:
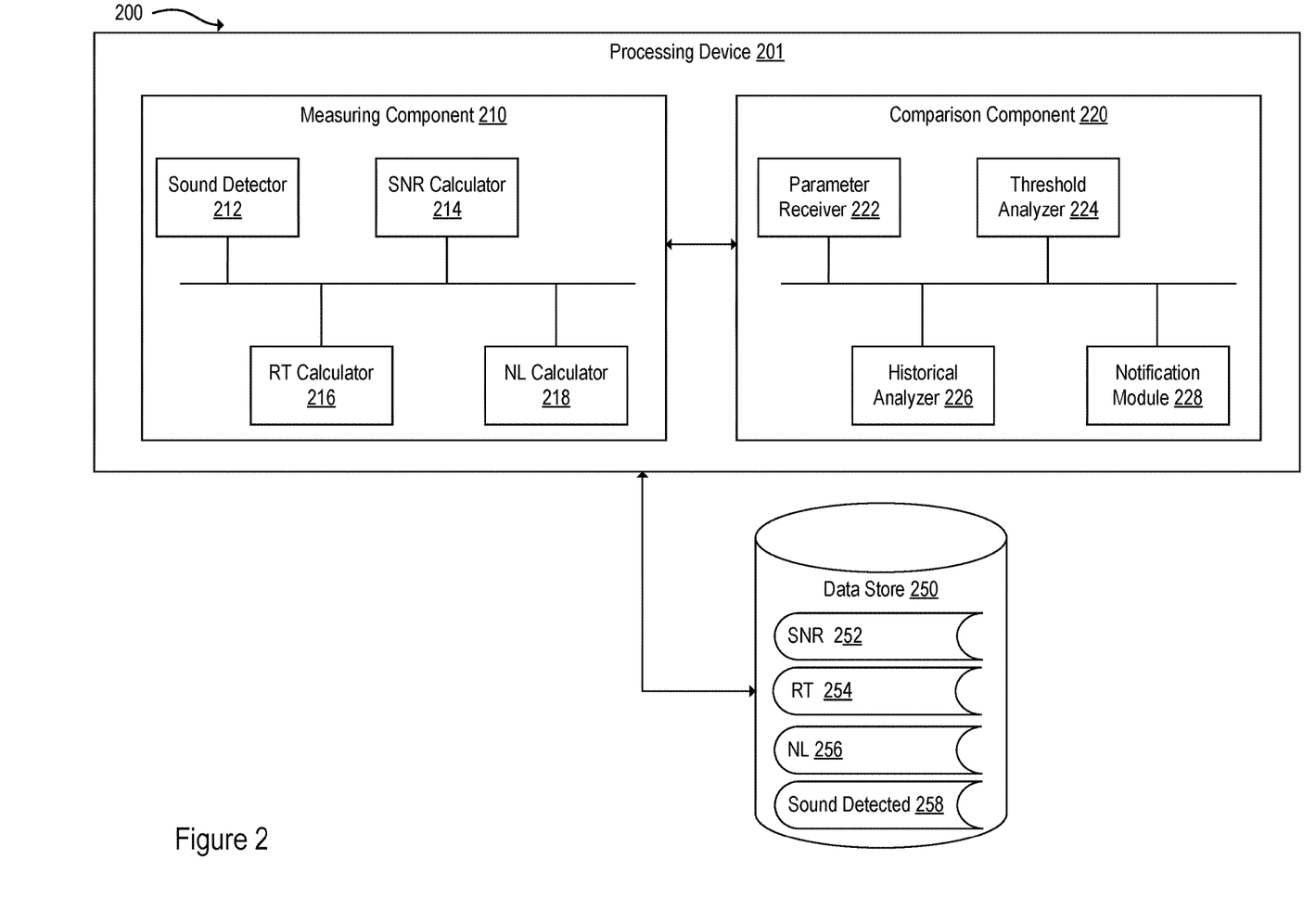
FIG. 2 depicts an example of a system architecture for measuring and comparing acoustic parameters, in accordance with an implementation of the disclosure.

FIG. 2 depicts an example of a system architecture 200 for measuring and comparing acoustic parameters, in accordance with an implementations of the disclosure.

The system architecture 200 includes one or more processing devices 201 and one or more data stores 250. In the example shown, the processing device 201 may include a measuring component 210 and a comparison component 220. The processing device 201 may be included in a videoconference device 110A-110N in FIG. 1, or in server 130 in FIG. 1. In another embodiment, the measuring component 210 may be included in videoconference device 110A-110N in FIG. 1, and the comparison component 220 may be included in server 130 in FIG. 1. Data store 250 may be included in videoconference device 110A-110N in FIG. 1, in server 130 in FIG. 1, or may be a separate store and communicatively coupled to the videoconference device 110A-110N in FIG. 1 and/or to server 130 in FIG. 1. Additional combinations not listed may also be used.

Measuring component 210 may include a sound detector 212, a signal-to-noise (SNR) calculator 214, a reverberation time (RT) calculator 216, and a noise level (NL) calculator 218. The sound detector 212 may enable the processing device 201 to receive sound detected in a room in which a videoconference device is located. A videoconference device may include one or more microphones that can detect and transmit sound. The sound detector 212 may store the sound in data store 250, as sound detected 258. The SNR calculator 214 may enable the processing device 201 to then use the sound detected 258 to calculate the signal-to-noise ratio of the room. The SNR calculator 214 may enable the processing device 201 to distinguish between background noise and the intended signal in the sound detected in the room. The SNR calculator 214 may further enable the processing device 201 to compare the background noise to the signal level in order to determine the signal-to-noise ratio, or SNR. The SNR may then be stored in SNR 252 of data store 250.

The RT calculator 216 may enable the processing device 201 to then use the sound detected 258 to determine the reverberation time. The RT calculator 216 may enable the processing device 201 to be able to use the sound detected in the room to determine how long it takes for the sound to fade away once the source of the sound has stopped. The RT may enable the processing device 201 to then be stored in RT 254 of data store 250. The NL calculator 218 may enable the processing device 201 to then determine the absolute noise level of the room at a given time, and store the noise level in NL 256 of data store 250.

The comparison component 220 may include a parameter receiver 222, a threshold analyzer 224, a historical analyzer 226, and a notification module 228. In one embodiment, the parameter receiver 222 may enable the processing device 201 to receive the calculated acoustic parameters from the measuring component 210. The calculated acoustic parameters may include the signal-to-noise ratio, the reverberation time, and the absolute noise level. In one embodiment, the parameter receiver 222 may retrieve the calculated parameters from the data store 250.

The threshold analyzer 224 of the comparison component 220 may enable the processing device 201 to compare the acoustic parameters to their respective thresholds stored in data store 250. The historical analyzer 226 may enable the processing device 201 to compare each acoustic parameter to its historically stored values. The notification module 228 may enable the processing device 201 to notify the users of the videoconference device of the acoustic parameters and their respective analysis. The notification module 228 may further enable to the processing device 201 to notify an administrator of the acoustic parameters associated with the videoconference device.

Figure 3:
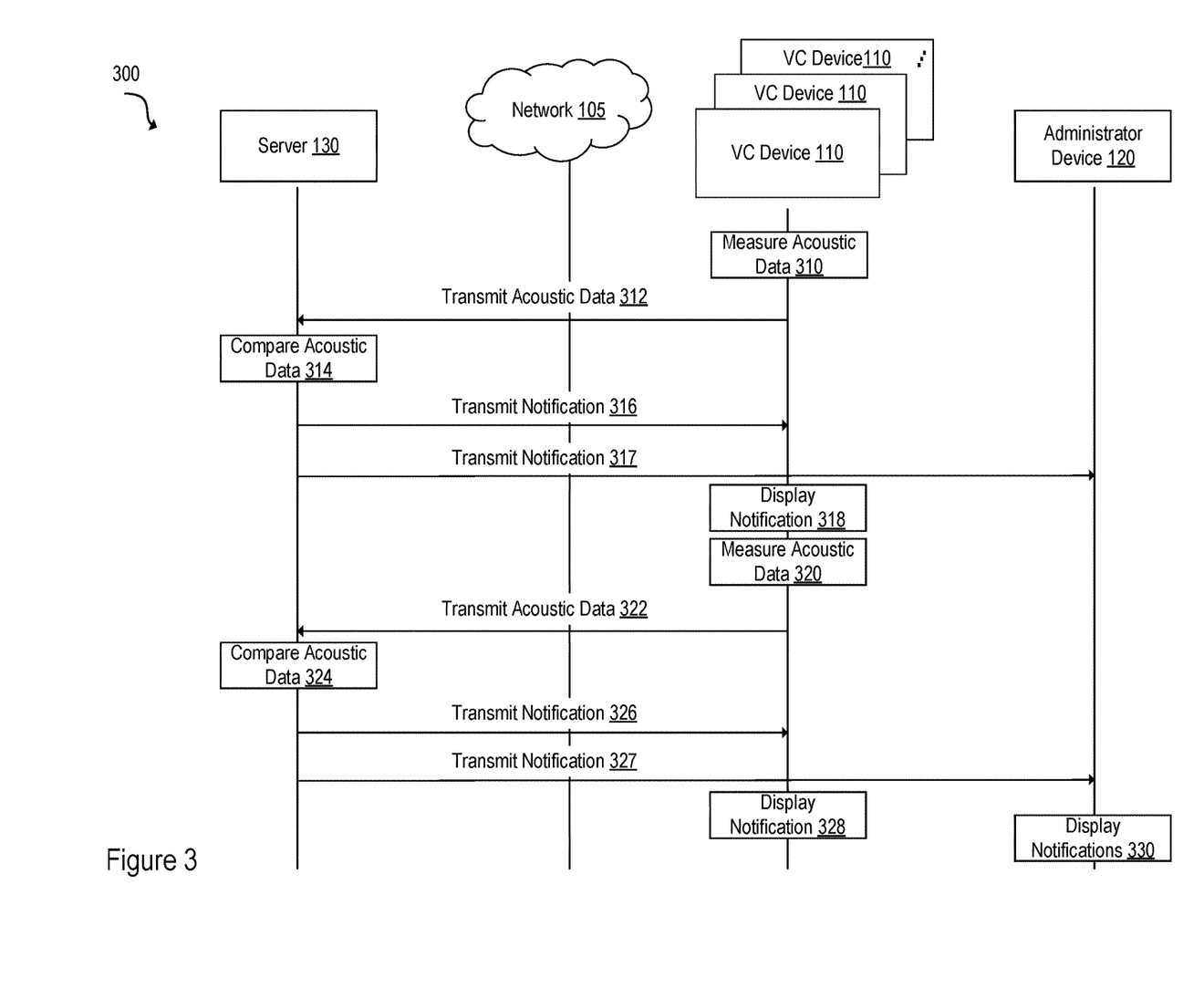
FIG. 3 illustrates the transfer of data between the entities illustrated in FIG. 1, in accordance with an implementation of the disclosure.

FIG. 3 illustrates the transfer of data between the entities illustrated in FIG. 1, in accordance with an implementation of the disclosure. At operation 310, videoconference device 110 may measure acoustic data. At operation 312, the videoconference device 110 may transmit the acoustic data via network 105 to a server 130. At operation 314, server 130 may compare the acoustic data to threshold values. Server 130 may also compare the acoustic data to historical data previously measured by videoconference device 110. At operation 316, server 130 may transmit a notification based on the comparison to the videoconference device 110 via network 105. At operation 317, server 130 may transmit a notification based on the comparison to administrator device 120 via network 105.

At operation 318, videoconference device 110 may display the notification. At operation 320, videoconference device 110 may measure a second set of acoustic data. At operation 322, videoconference device 110 may transmit the second set of acoustic data to server 130. At operation 324, server 130 may compare the second set of acoustic data to the first set of acoustic data received at operation 312. Server 130 may also compare the second set of acoustic data to threshold values, and/or to historical data previously measured by videoconference device 110.

At operation 326, server 130 may transmit a notification to videoconference device 110. At operation 327, server 130 may transmit a notification to administrator device 120. At operation 328, videoconference device 110 may display the notification received from server 130. At block 330, administrator device 120 may display the notifications received from server 130.

Figure 4:
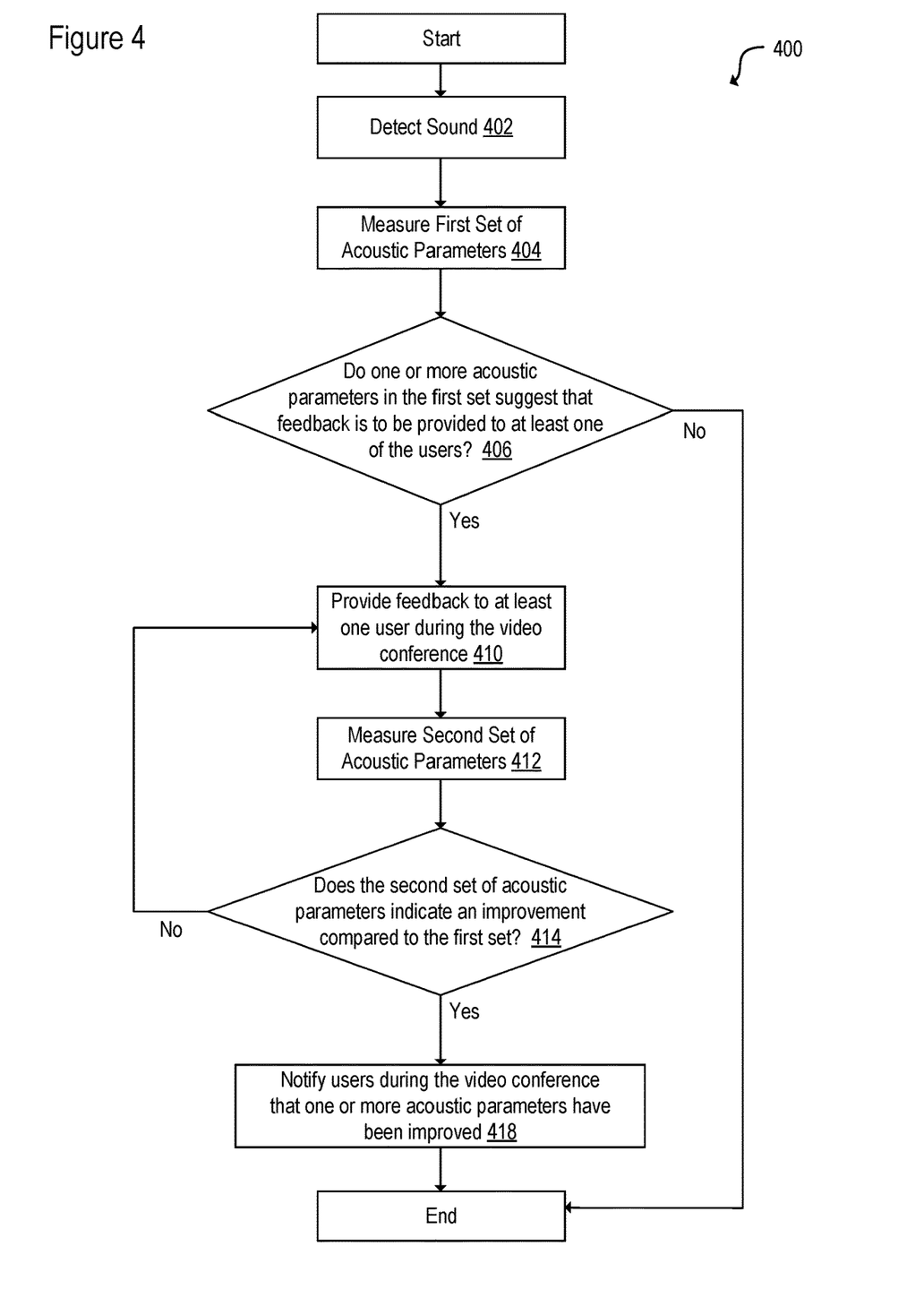
FIG. 4 depicts a flow diagram of a method for detecting and flagging acoustic problems in videoconferencing, in accordance with an implementation of the disclosure.

FIG. 4 depicts a flow diagram of a method 400 for detecting and flagging acoustic problems in videoconferencing, in accordance with one implementation of the disclosure. The method 400 may be performed by a client-based application that runs on a videoconference device 110A-110N. The client-based application may be executed by a processing device of the videoconference devices 110A-110N.

For simplicity of explanation, the method 400 of this disclosure is depicted and described as a series of acts. However, acts in accordance with this disclosure can occur in various orders and/or concurrently, and with other acts not presented and described herein. Furthermore, not all illustrated acts may be required to implement the method 400 in accordance with the disclosed subject matter. In addition, those skilled in the art will understand and appreciate that the method 400 could alternatively be represented as a series of interrelated states via a state diagram or events. Additionally, it should be appreciated that the method 400 disclosed in this specification is capable of being stored on an article of manufacture to facilitate transporting and transferring such method to computing devices. The term "article of manufacture," as used herein, is intended to encompass a computer program accessible from any computer-readable device or storage media.

At operation 402, the processing device of a videoconference device 110A-110N may detect sound in the conference room in which the videoconference device 110A-110N is located. The sound may be detected during a video conference conducted between several users. The videoconference device 110A-110N may be equipped with a microphone that is able to detect and measure sounds. At operation 404, the processing device may measure (e.g., in real time) a first set of acoustic parameters based on the noise detected at operation 402. For example, the processing device may distinguish between background noise and the intended signal received from the microphone, and calculate the signal-to-noise ratio. The processing device may also calculate the reverberation time and absolute noise level as described above.

At operation 406, the processing device may determine whether one or more acoustic parameters in the first set suggest that a feedback should be provided to at least one of the participating users regarding an action to be performed to improve the acoustic parameters during the video conference. In some implementations, the determination may be made by the processing device comparing the first set of acoustic parameters to their respective thresholds. If one or more of the acoustic parameters is outside of its respective threshold, the processing device may determine to provide feedback to the user(s) and continue to operation 410. If all of the acoustic parameters are within their respective thresholds, the processing device may determine not to provide feedback and the method ends.

In other implementations, the determination may be made based on information received by the processing device from the server. The processing device may send the first set of acoustic parameters to the server, which compares the first set of acoustic parameters to their respective thresholds. The processing device may send acoustic parameters periodically. Alternatively, the processing device may send acoustic parameters to the server upon determining that the acoustic parameters indicate an acoustic change in the conference room, for example a sudden influx of background noise. If one or more of the acoustic parameters is outside of its respective threshold, the server may provide information to the processing device, indicating that feedback is to be provided to at least one of the participating users regarding an action to be performed to improve the acoustic parameters during the video conference.

At operation 410, the processing device may provide feedback to at least one of the users during the video conference, notifying the user(s) of the acoustic parameters. This notification may be an audio signal, such as a sound to alert the user(s) of an irregular acoustic parameter, or a visual notification, such as a pop-up window. In one embodiment, the notification may be a light flashing on the videoconference device. The notification may be a combination of these examples, or may include some other form of notification.

At operation 412, the processing device may measure a second set of acoustic parameters. At operation 414, the processing device may determine whether the second set of acoustic data indicates an improvement compared to the first set of acoustic data during the video conference. In some implementations, the determination may be made by the processing device comparing the second set of acoustic parameters to the first set, and/or comparing the second set of acoustic parameters to their respective thresholds. In other implementations, the determination may be made based on information received by the processing device from the server. The processing device may send the second set of acoustic data to the server, which compares the second set of acoustic data to the first set of acoustic data, and/or compares the acoustic parameters in the second set to their respective thresholds. The server may provide information indicating whether the second set of acoustic data is an improvement as compared to the first set of acoustic data. For example, if the second signal-to-noise ratio is higher than the first signal-to-noise ratio, then the processing device and/or the server may determine that the signal-to-noise ratio parameter has improved since the processing device provided the feedback to the user(s). In another example, if the second absolute noise level is lower than the first absolute noise level, then the processing device and/or the server may determine that the noise level has improved since the processing device provided the feedback to the user(s). The processing device and/or the server may also compare the second set of acoustic parameters to their respective threshold values. As an example, the processing device and/or the server may determine that the second reverberation time parameter is within its threshold value, and hence may determine at operation 414 that the acoustic parameters have been improved.

If the processing device determines at operation 414 that any of the acoustic parameters in the second set is outside of its respective threshold, or that any of the acoustic parameters in the second set is not an improvement as compared to the first set, the method goes back to operation 410 and the processing device may provide feedback to at least one users, notifying the user(s) of the problem.

If the processing device determines at operation 414 that all the acoustic parameters are now within their respective thresholds, indicating an improvement as compared to the first set, then the method moves to operation 418 and the processing device notifies the users of the improvement. The method then ends.

Figure 5:
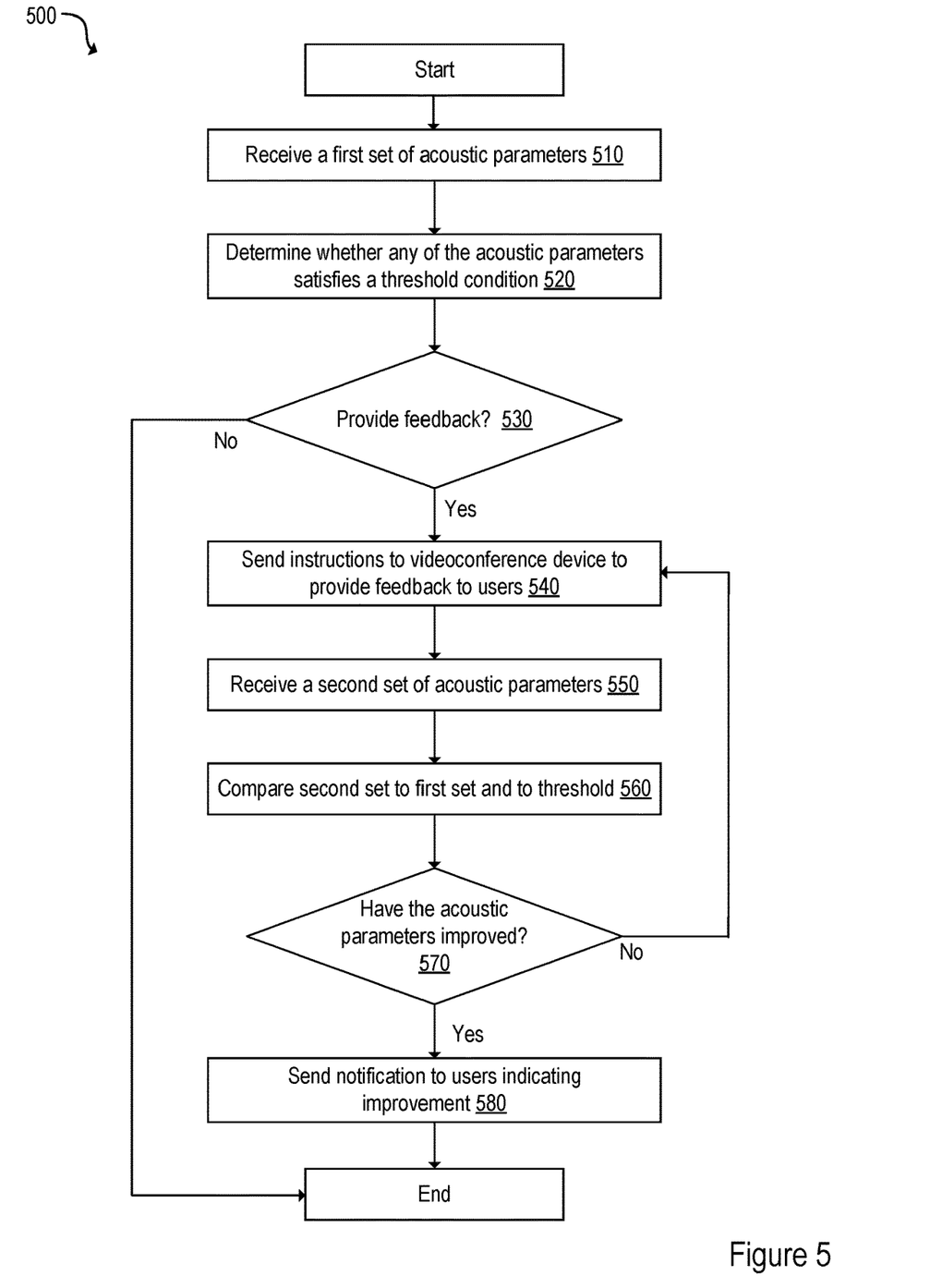
FIG. 5 depicts a flow diagram of a method for detecting and flagging acoustic problems in videoconferencing, in accordance with another implementation of the disclosure.

FIG. 5 depicts a flow diagram of a method 500 for detecting and flagging acoustic problems in videoconferencing, in accordance with one implementation of the disclosure. The method 500 may be performed by a server-based application that runs on a server 130. The sever-based application may be executed by a processing device of the server 130.

For simplicity of explanation, the method 500 of this disclosure is depicted and described as a series of acts. However, acts in accordance with this disclosure can occur in various orders and/or concurrently, and with other acts not presented and described herein. Furthermore, not all illustrated acts may be required to implement the method 500 in accordance with the disclosed subject matter. In addition, those skilled in the art will understand and appreciate that the method 500 could alternatively be represented as a series of interrelated states via a state diagram or events. Additionally, it should be appreciated that the method 500 disclosed in this specification is capable of being stored on an article of manufacture to facilitate transporting and transferring such method to computing devices. The term "article of manufacture," as used herein, is intended to encompass a computer program accessible from any computer-readable device or storage media.

At operation 510, the processing device of a server 130 may receive a first set of acoustic parameters from a videoconference device 110A-110N during a video conference. At operation 520, the processing device may determine whether any of the acoustic parameters satisfies a threshold condition. A threshold condition specifies a threshold pertaining to a relevant acoustic parameter and indicates whether the relevant acoustic parameter should exceed, be below, or be equal to the threshold in order to satisfy the threshold condition. At operation 530, based on the determination at operation 520, the processing device determines whether to provide feedback to the user(s) of the videoconference device 110A-110N during the video conference. If any of the acoustic parameters is outside of its respective threshold value, the processing device may determine to provide feedback to the user(s) during the video conference and move on to operation 540. Otherwise, if all of the acoustic parameters are within their respective thresholds, the method ends.

At operation 540, the processing device may send instructions to the videoconference device 110A-110N to provide feedback to the user(s) during the video conference based on the acoustic parameters that are not within their respective threshold values. At operation 550, the processing device may receive a second set of acoustic parameters measured after the notification of suggested improvement has been provided to the user(s). At operation 560, the processing device may compare the second set of acoustic parameters to the first set, and/or may compare the second set of acoustic parameters to their respective threshold values, in order to determine whether the acoustic parameters have improved. For example, if the signal-to-noise ratio in the second set is higher than the signal-to-noise ratio in the first set, then the processing device may determine that the signal-to-noise ratio has improved. As another example, if the reverberation time in the second set is now within the threshold level, the processing device may determine that the reverberation time has improved. As yet another example, if the absolute noise level has decreased but is still not within the acceptable threshold, then the processing device may determine that the absolute noise level has not improved.

At operation 570, the processing device decides whether the second set of acoustic parameters indicates an improvement as compared to the first set. If so, the method moves to operation 580 and the processing device instructs the videoconference device 110A-110N to send a notification to the user(s) indicating the improvement. The method then ends.

If at operation 570 the processing device decided that the second set of acoustic parameters does not indicate an improvement, then the method skips back to operation 540. At operation 540, the processing device sends instructions to the videoconference device 110A-110N to provide feedback to the user(s), notifying the user(s) that the acoustic parameters are not within their acceptable ranges, and the method continues.

Figure 6:
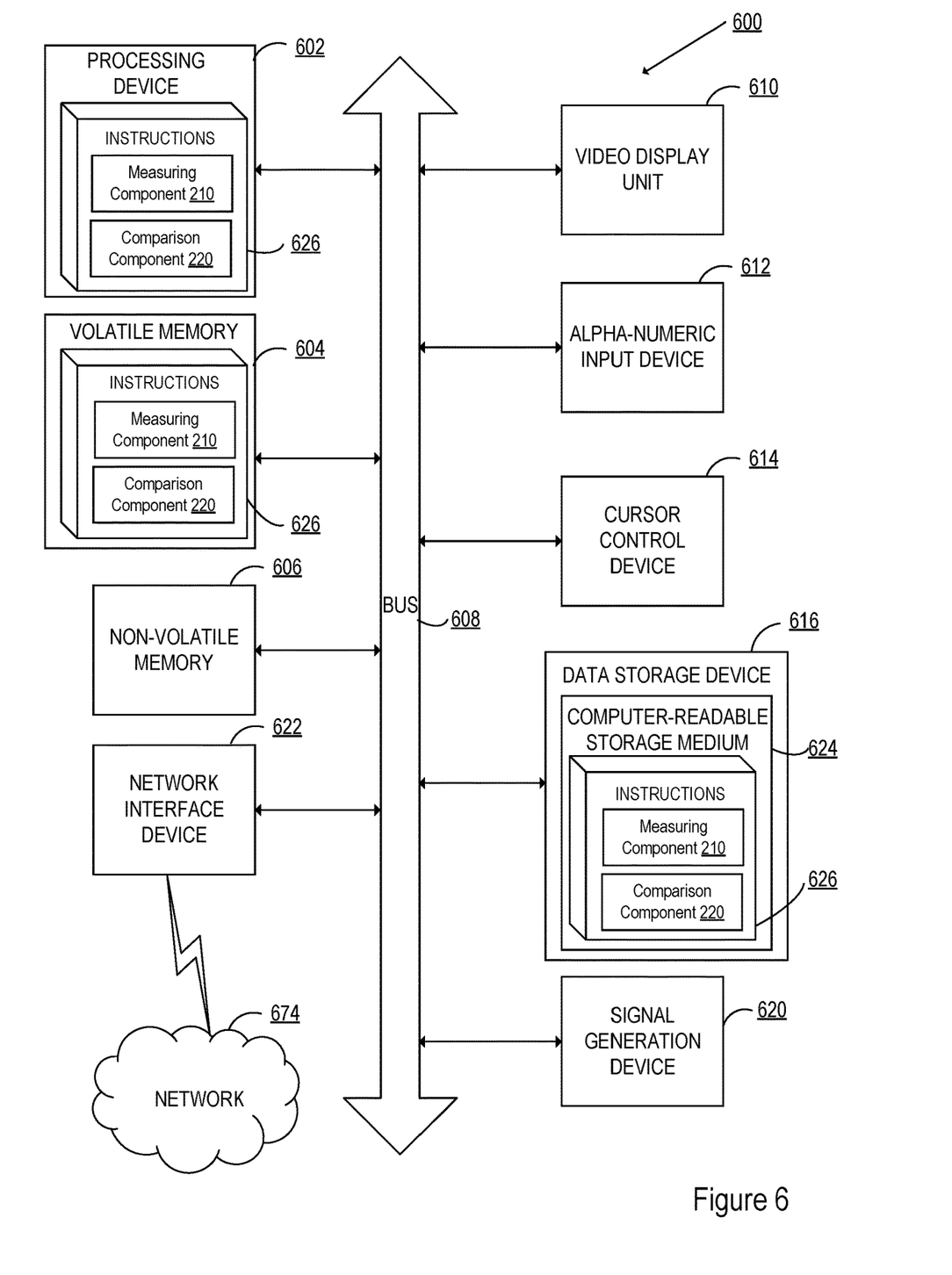
FIG. 6 depicts a block diagram of a computer system operating in accordance with an implementation of the disclosure.

FIG. 6 depicts a block diagram of a computer system operating in accordance with one or more aspects of the present disclosure. In various illustrative examples, computer system 600 may correspond to any of the computing devices within system architecture 100 of FIG. 1. In one implementation, the computer system 600 may be a server 130. In another implementation, the computer system 600 may be each of the videoconference devices 110A-110N of FIG. 1.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 may also include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 400 and 500, and for measuring component 210 or comparison component 220 of FIG. 2.

Instructions 626 may also reside, completely or partially, within volatile memory 604 and/or within the processing device 602 during execution thereof by computer system 600, hence, volatile memory 604, and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware resources. Further, the methods, components, and features may be implemented in any combination of hardware resources and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and 500, and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
measuring, by a processing device of a user videoconferencing device, a first set of acoustic data associated with a conference room during a video conference attended by a plurality of users, the first set of acoustic data indicating one or more first acoustic parameters comprising at least one of first reverberation time, first signal-to-noise ratio, or first absolute noise level of the conference room;
comparing, by the processing device of the user videoconferencing device, the one or more of the first acoustic parameters to one or more thresholds during the video conference;
providing, by the processing device of the user videoconferencing device, at least one of the first acoustic parameters or a result of the comparing to at least one user during the video conference;
measuring, by the processing device of the user video conferencing device, a second set of acoustic data associated with the conference room during the video conference attended by the plurality of users; and
providing, by the processing device of the user video conferencing device, to the at least one user during the video conference, an indication of whether the second set of acoustic data indicates an improvement compared to the first set of acoustic data.

2. The method of claim 1, wherein measuring the first set of acoustic data associated with the conference room during the video conference attended by the plurality of users comprises:
detecting, by the processing device of the user videoconferencing device, a sound signal generated from a source in the conference room;
measuring a background noise level in the conference room;
determining the first reverberation time based on estimation of an amount of time for the sound signal to fade after the source has stopped emitting sound;
determining the first signal-to-noise ratio based on comparison of the sound signal to the background noise level; and
determining the first absolute noise level based on the sound signal and the background noise level.

3. The method of claim 1, wherein providing the at least one of the first acoustic parameters or the result of the comparing to the at least one user during the video conference comprises performing at least one of:

displaying a notification on a graphical user interface of the user videoconferencing device;
causing the user videoconferencing device to emit a sound; or
causing a light on the user videoconferencing device to flash.

4. The method of claim 1, wherein the second set of acoustic data indicates one or more second acoustic parameters comprising at least one of second reverberation time, second signal-to-noise ratio, or second absolute noise level of the conference room, and wherein the first set of acoustic data precedes the second set of acoustic data, the method further comprising:
determining whether the second set of acoustic data indicates the improvement compared to the first set of acoustic data during the video conference; and
responsive to determining that the second set of acoustic data indicates the improvement, notifying the plurality of users during the video conference that the one or more of the first acoustic parameters have been improved.

5. The method of claim 4, wherein determining whether the second set of acoustic data indicates an improvement compared to the first set of acoustic data comprises at least one of:
determining whether the second reverberation time is lower than the first reverberation time;
determining whether the second signal-to-noise ratio is higher than the first signal-to-noise ratio; or
determining whether the second absolute noise level is lower than the first absolute noise level.

6. The method of claim 1, further comprising:
determining whether one or more of the first acoustic parameters suggest that a feedback is to be provided to at least one of the plurality of users regarding an action to be performed to improve the one or more of the first acoustic parameters during the video conference, wherein the action to be performed to improve the one or more of the first acoustic parameters during the video conference comprises at least one of: altering a behavior causing excess background noise, moving a location of a microphone to increase signal-to-noise ratio, or covering reflective surfaces to reduce reverberation time.

7. The method of claim 6, further comprising:
determining the action to be performed to improve the one or more of the first acoustic parameters during the video conference, wherein the determining is performed based on a set of rules or an output of a trained machine learning model.

8. A system comprising:
a memory; and
a processing device communicably coupled to the memory, the processing device to:
measure a first set of acoustic data associated with a conference room during a video conference attended by a plurality of users, the first set of acoustic data indicating one or more first acoustic parameters comprising at least one of first reverberation time, first signal-to-noise ratio, or first absolute noise level of the conference room;
compare the one or more of the first acoustic parameters to one or more thresholds during the video conference;
provide at least one of the first acoustic parameters or a result of the comparison to at least one user during the video conference;
measure a second set of acoustic data associated with the conference room during the video conference attended by the plurality of users; and
provide to the at least one user during the video conference, an indication of whether the second set of acoustic data indicates an improvement compared to the first set of acoustic data.

9. The system of claim 8, wherein to measure the first set of acoustic data associated with the conference room during the video conference attended by the plurality of users, the processing device is further to:
detect a sound signal generated from a source in the conference room;
measure a background noise level in the conference room;
determine the first reverberation time based on estimation of an amount of time for the sound signal to fade after the source has stopped emitting sound;
determine the first signal-to-noise ratio based on comparison of the sound signal to the background noise level; and
determine the first absolute noise level based on the sound signal and the background noise level.

10. The system of claim 8, wherein to provide the at least one of the first acoustic parameters or the result of the comparison to the at least one user during the video conference, the processing device is further to perform at least one of:
display a notification on a graphical user interface of a user videoconference device;
cause the user videoconference device to emit a sound; or
cause a light on the user videoconference device to flash.

11. The system of claim 8, wherein the second set of acoustic data indicates one or more second acoustic parameters comprising at least one of second reverberation time, second signal-to-noise ratio, or second absolute noise level of the conference room, and wherein the first set of acoustic data precedes the second set of acoustic data, and wherein the processing device is further to:
determine whether the second set of acoustic data indicates an improvement compared to the first set of acoustic data during the video conference; and
responsive to determining that the second set of acoustic data indicates an improvement, notify the plurality of users during the video conference that the one or more of the first acoustic parameters have been improved.

12. The system of claim 11, wherein to determine whether the second set of acoustic data indicates an improvement compared to the first set of acoustic data comprises at least one of:
determining whether the second reverberation time is lower than the first reverberation time;
determining whether the second signal-to-noise ratio is higher than the first signal-to-noise ratio; or
determining whether the second absolute noise level is lower than the first absolute noise level.

13. The system of claim 8, wherein the processing device is further to:
determine whether one or more of the first acoustic parameters suggest that a feedback is to be provided to at least one of the plurality of users regarding an action to be performed to improve the one or more of the first acoustic parameters during the video conference, wherein the action to be performed to improve the one or more of the first acoustic parameters during the video conference comprises at least one of: altering a behavior causing excess background noise, moving a location of a microphone to increase signal-to-noise ratio, or covering reflective surfaces to reduce reverberation time.

14. A non-transitory machine-readable storage medium comprising instructions that cause a processing device to:
   measure a first set of acoustic data associated with a conference room during a video conference attended by a plurality of users, the first set of acoustic data indicating one or more first acoustic parameters comprising at least one of first reverberation time, first signal-to-noise ratio, or first absolute noise level of the conference room;
   compare the one or more of the first acoustic parameters to one or more thresholds during the video conference;
   provide, during the video conference, at least one of the first acoustic parameters or a result of the comparison to at least one user or an administrator of a computing system providing the video conference;
   measure a second set of acoustic data associated with the conference room during the video conference attended by the plurality of users; and
   provide to the at least one user during the video conference, an indication of whether the second set of acoustic data indicates an improvement compared to the first set of acoustic data.

15. The non-transitory machine-readable storage medium of claim 14, wherein to measure the first set of acoustic data associated with the conference room during the video conference attended by the plurality of users, the processing device is further to:
   detect a sound signal generated from a source in the conference room;
   measure a background noise level in the conference room;
   determine the first reverberation time based on estimation of an amount of time for the sound signal to fade after the source has stopped emitting sound;
   determine the first signal-to-noise ratio based on comparison of the sound signal to the background noise level; and
   determine the first absolute noise level based on the sound signal and the background noise level.

16. The non-transitory machine-readable storage medium of claim 14, wherein to provide the at least one of the first acoustic parameters or the result of the comparison to the at least one user or the administrator of the computing system providing the video conference, the processing device is further to perform at least one of:
   display a notification on a graphical user interface of a user videoconference device;
   cause the user videoconference device to emit a sound; or
   cause a light on the user videoconference device to flash.

17. The non-transitory machine-readable storage medium of claim 14, wherein the second set of acoustic data indicates one or more second acoustic parameters comprising at least one of second reverberation time, second signal-to-noise ratio, or second absolute noise level of the conference room, and wherein the first set of acoustic data precedes the second set of acoustic data, and the processing device is further to:
   determine whether the second set of acoustic data indicates an improvement compared to the first set of acoustic data during the video conference; and
   responsive to determining that the second set of acoustic data indicates an improvement, notify the plurality of users during the video conference that the one or more of the first acoustic parameters have been improved.

18. The non-transitory machine-readable storage medium of claim 17, wherein the processing device to determine whether the second set of acoustic data indicates an improvement compared to the first set of acoustic data further comprises the processing device to:
   determine whether the second reverberation time is lower than the first reverberation time;
   determine whether the second signal-to-noise ratio is higher than the first signal-to-noise ratio; or
   determine whether the second absolute noise level is lower than the first absolute noise level.

19. The non-transitory machine-readable storage medium of claim 14, the processing device is further to:
   determine whether one or more of the first acoustic parameters suggest that a feedback is to be provided to at least one of the plurality of users regarding an action to be performed to improve the one or more of the first acoustic parameters during the video conference, wherein the action to be performed to improve the one or more of the first acoustic parameters during the video conference comprises at least one of: altering a behavior causing excess background noise, moving a location of a microphone to increase signal-to-noise ratio, or covering reflective surfaces to reduce reverberation time.

20. The non-transitory machine-readable storage medium of claim 19, the processing device is further to:
   determine the action to be performed to improve the one or more of the first acoustic parameters during the video conference, wherein the determining is performed based on a set of rules or an output of a trained machine learning model.

* * * * *